United States Patent
Park

(10) Patent No.: US 8,879,203 B2
(45) Date of Patent: Nov. 4, 2014

(54) SPINDLE MOTOR HAVING LOWER THRUST MEMBER WITH INSERTION PROTRUSION AND HARD DISK DRIVE INCLUDING THE SAME

(71) Applicant: Samsung Electro-Mechanics Co., Ltd., Suwon (KR)

(72) Inventor: Young Ha Park, Suwon (KR)

(73) Assignee: Samsung Electro-Mechanics Co., Ltd., Suwon (KR)

( * ) Notice: Subject to any disclaimer, the term of this patent is extended or adjusted under 35 U.S.C. 154(b) by 16 days.

(21) Appl. No.: 13/717,916

(22) Filed: Dec. 18, 2012

(65) Prior Publication Data

US 2014/0078615 A1 Mar. 20, 2014

(30) Foreign Application Priority Data

Sep. 14, 2012 (KR) .................. 10-2012-0102156

(51) Int. Cl.
| | | |
|---|---|---|
| G11B 17/02 | (2006.01) | |
| H02K 7/08 | (2006.01) | |
| G11B 19/20 | (2006.01) | |
| H02K 5/167 | (2006.01) | |

(52) U.S. Cl.
CPC .......... *H02K 5/1677* (2013.01); *G11B 19/2009* (2013.01); *G11B 19/2036* (2013.01); *H02K 7/086* (2013.01)
USPC ........................................ 360/99.08; 310/90

(58) Field of Classification Search
CPC .. F16C 33/107; F16C 17/107; F16C 2370/12; H02K 7/085; H02K 5/1675; H02K 5/1677; G11B 19/2009; G11B 19/2036
See application file for complete search history.

(56) References Cited

U.S. PATENT DOCUMENTS

| | | | | |
|---|---|---|---|---|
| 5,634,724 | A * | 6/1997 | Zang et al. | 384/107 |
| 5,885,005 | A * | 3/1999 | Nakano et al. | 384/113 |
| 5,973,878 | A * | 10/1999 | Yoshida et al. | 360/98.07 |
| 6,246,136 | B1 * | 6/2001 | Ichiyama | 310/90 |
| 6,315,452 | B1 * | 11/2001 | Titcomb | 384/114 |
| 7,220,054 | B2 * | 5/2007 | Gomyo | 384/107 |
| 7,224,552 | B2 * | 5/2007 | Herndon et al. | 360/98.08 |
| 7,317,271 | B2 * | 1/2008 | Obata et al. | 310/90 |
| 8,107,190 | B2 * | 1/2012 | Ito et al. | 360/99.08 |
| 8,508,882 | B1 * | 8/2013 | Tamaoka et al. | 360/99.08 |
| 8,593,757 | B2 * | 11/2013 | Sugi et al. | 360/99.08 |
| 8,599,517 | B1 * | 12/2013 | Abe | 360/99.08 |
| 2003/0024099 | A1 * | 2/2003 | Gomyo | 29/525.01 |
| 2003/0201682 | A1 * | 10/2003 | Kull | 310/67 R |
| 2005/0141136 | A1 * | 6/2005 | Kitamura | 360/99.08 |
| 2006/0078240 | A1 * | 4/2006 | Braun | 384/107 |
| 2006/0147135 | A1 | 7/2006 | Kim | |
| 2007/0230841 | A1 * | 10/2007 | Yano et al. | 384/110 |

(Continued)

FOREIGN PATENT DOCUMENTS

| | | |
|---|---|---|
| JP | 2008-190660 | 8/2008 |
| KR | 10-2006-0079630 | 7/2006 |

*Primary Examiner* — Brian Miller

(57) ABSTRACT

There are provided a spindle motor and a hard disk drive including the same, the spindle motor including a lower thrust member fixed to a base member; a shaft fixed to the lower thrust member; a sleeve disposed on the lower thrust member and rotatably installed with respect to the shaft; and a rotor hub coupled to the sleeve to rotate in conjunction therewith, wherein the lower thrust member has an insertion protrusion protruding upwardly in an axial direction and inserted into a fixing groove formed in a lower end of the shaft upwardly in the axial direction.

18 Claims, 7 Drawing Sheets

(56) References Cited

U.S. PATENT DOCUMENTS

2012/0300346 A1* 11/2012 Park .......................... 360/99.08
2014/0036390 A1* 2/2014 Lee et al. ................... 360/99.08
2014/0078615 A1* 3/2014 Park .............................. 360/86

* cited by examiner

SPINDLE MOTOR HAVING LOWER THRUST MEMBER WITH INSERTION PROTRUSION AND HARD DISK DRIVE INCLUDING THE SAME

CROSS-REFERENCE TO RELATED APPLICATIONS

This application claims the priority of Korean Patent Application No. 10-2012-0102156 filed on Sep. 14, 2012, in the Korean Intellectual Property Office, the disclosure of which is incorporated herein by reference.

BACKGROUND OF THE INVENTION

1. Field of the Invention

The present invention relates to a spindle motor and a hard disk drive including the same.

2. Description of the Related Art

A so-called fixed shaft-type spindle motor in which a shaft having excellent vibration properties is fixed to a case of a hard disk driving device is frequently used in an information recording/reproducing device of a hard disk driving device for a server.

That is, the shaft is fixed to the spindle motor mounted on the hard disk driving device for the server, in order to prevent information recorded on a disk from being corrupted and not being able to be read or to prevent information from not being able to be written to a disk when an amplitude of a rotor is increased due to external vibrations.

As such, in the case in which a fixed type shaft is installed, a thrust member is provided in upper and lower portions of the shaft.

However, in the case in which the shaft is fixed to the lower thrust member and the lower thrust member is fixed to a base, the shaft needs to be firmly fixed, so the lower thrust member is thicker to be fixed to an outer circumferential surface of the shaft by as press-fitting, bonding, and slide-coupling or the like.

Meanwhile, recently, as hard disk drives have been thinned, the spindle motor used therein has also been thinned. However, as described above, in the case in which the lower thrust member is thick, since thinness of the spindle motor is prevented and a length of a bearing span is unavoidably shortened, whereby the performance of the motor may be deteriorated.

Patent Document 1 relates to a fixed shaft-type spindle motor and includes upper and lower thrust members 230 and 220. As illustrated in FIG. 4, in the case of a structure in which a shaft 210 is fixed to the thrust member 220, the shaft 210 may be firmly fixed in the case that the lower thrust member 220 is relatively thick.

RELATED ART DOCUMENT (Patent Document 1) Korean Patent Laid-Open Publication No. 2006-0079630

SUMMARY OF THE INVENTION

An aspect of the present invention provides a spindle motor that can be thinned by allowing a thickness of a lower thrust member to be relatively thin while serving as a fixed shaft-type spindle motor.

Another aspect of the present invention provides a spindle motor capable of improving operational performance because the length of a bearing span can be increased by allowing the thickness of a lower thrust member to be thin while serving as a fixed shaft-type spindle motor.

According to an aspect of the present invention, there is provided a spindle motor, including: a lower thrust member fixed to a base member; a shaft fixed to the lower thrust member; a sleeve disposed on the lower thrust member and rotatably installed with respect to the shaft; and a rotor hub coupled to the sleeve to rotate in conjunction therewith, wherein the lower thrust member has an insertion protrusion protruding upwardly in an axial direction and inserted into a fixing groove formed in a lower end of the shaft upwardly in the axial direction.

The insertion protrusion may be press-fitted into the fixing groove.

The insertion protrusion may have a pressing protrusion provided on an outer circumferential surface thereof.

The pressing protrusion may have less strength than the shaft.

The pressing protrusion may be provided to have a circular shape in a circumferential direction along the outer circumferential surface of the insertion protrusion.

The pressing protrusion may be provided to have a spiral shape in a circumferential direction along the outer circumferential surface of the insertion protrusion.

The pressing protrusion may include at least two pressing protrusions vertically spaced apart from each other by a predetermined interval, and the at least two pressing protrusions may have an adhesive applied therebetween.

The pressing protrusion having the spiral shape may have an adhesive applied therebetween.

The insertion protrusion may be slide-inserted or screw-coupled to the fixing groove.

The insertion protrusion may be bonded to the fixing groove by an adhesive.

The shaft may include a through hole allowing the fixing groove to communicate with the outside in the axial direction.

The insertion protrusion of the lower thrust member may have a communicating hole passing through upper and lower portions thereof in the axial direction.

The lower thrust member and the sleeve may form a liquid-gas interface of a lubricant and air therebetween.

The spindle motor may further include an upper thrust member fixed to an upper end portion of the shaft and forming a liquid-gas interface of a lubricant and air with the sleeve.

The sleeve and the rotor hub may be integrally formed.

The shapes of an outer circumferential surface of the shaft may be the same as each other before and after the insertion protrusion is inserted into the fixing groove.

The base member and the lower thrust member may be integrally formed.

According to another aspect of the present invention, there is provided a hard disk drive, including: the spindle motor as described above rotating a disk by power supplied through a substrate; a magnetic head reading data from and writing data to the disk; and a head transferring unit moving the magnetic head to a predetermined position above the disk.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE EMBODIMENTS

Figure 1:
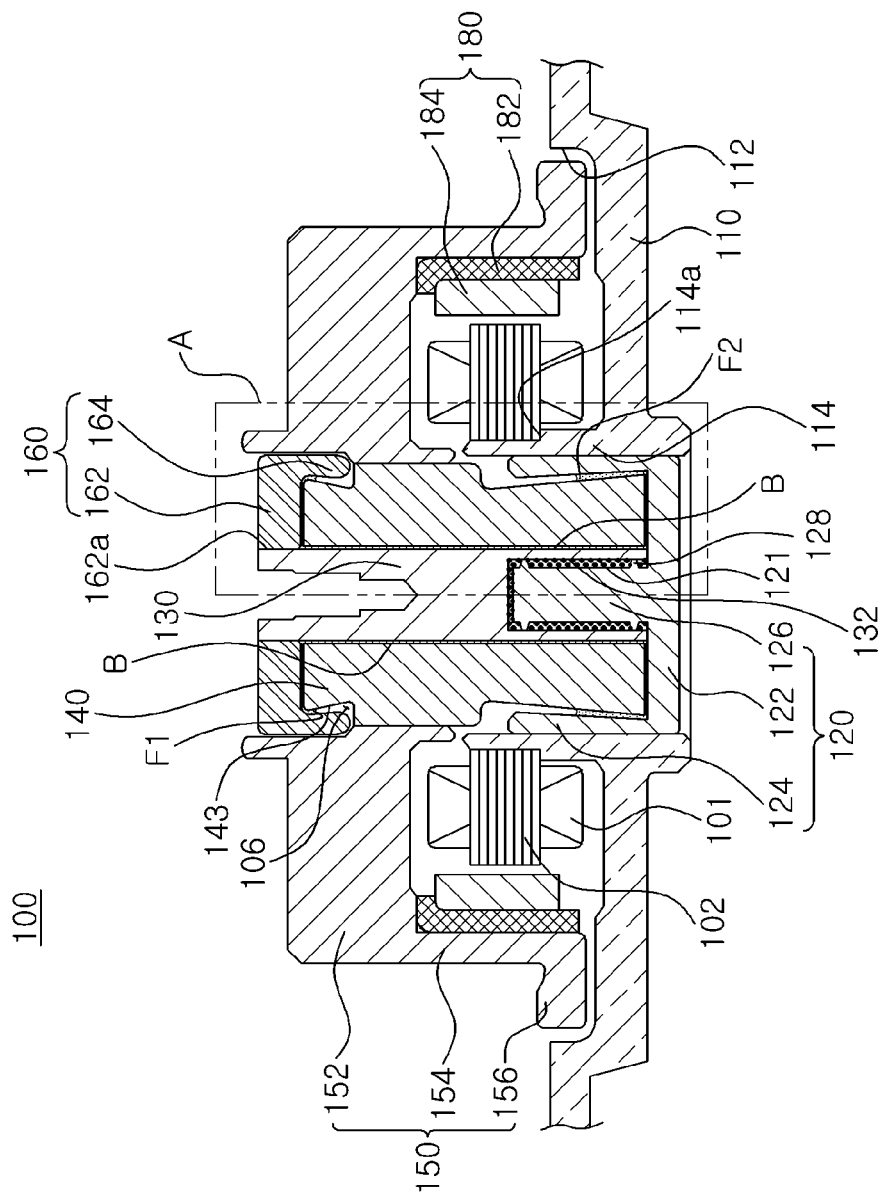
FIG. 1 is a cross-sectional view schematically illustrating a spindle motor according to an embodiment of the present invention.

Hereinafter, embodiments of the present invention will be described in detail with reference to the accompanying drawings. The invention may, however, be embodied in many different forms and should not be construed as being limited to the embodiments set forth herein. Rather, these embodiments are provided so that this disclosure will be thorough and complete, and will fully convey the scope of the invention to those skilled in the art.

In the drawings, the shapes and dimensions of components may be exaggerated for clarity, and the same reference numerals will be used throughout to designate the same or like components.

Figure 2:
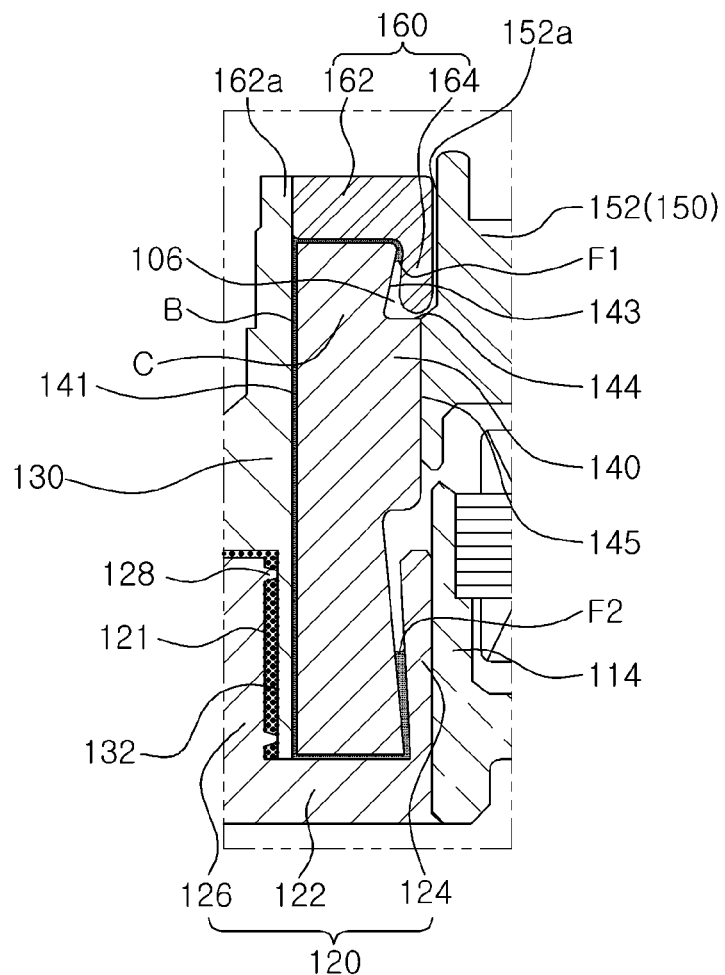
FIG. 2 is an enlarged view illustrating portion A of FIG. 1.
Figure 3:
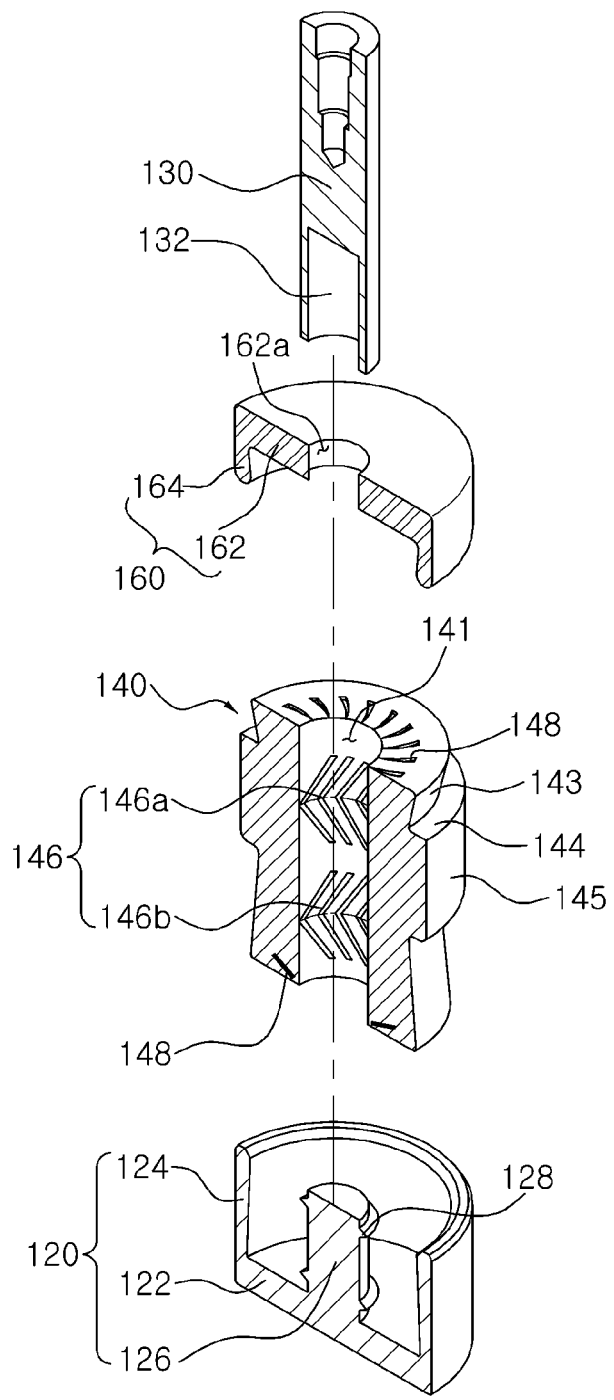
FIG. 3 is a partially cut-away exploded perspective view illustrating a sleeve and upper and lower thrust members according to the embodiment of the present invention.
Figure 4:
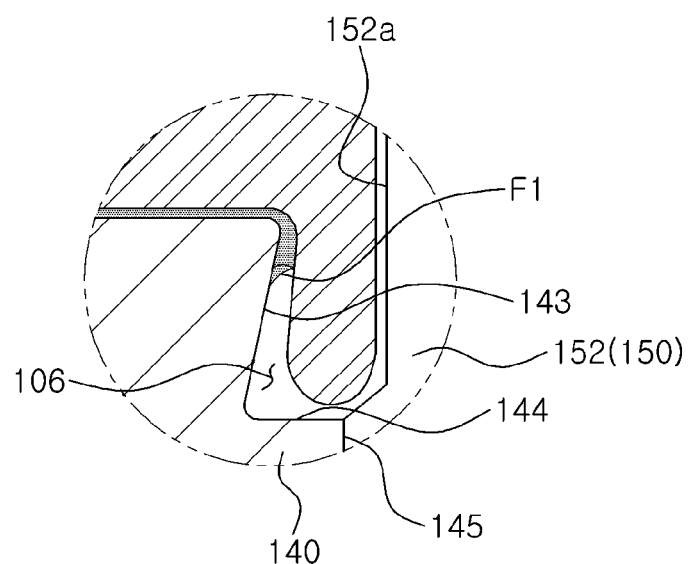
FIG. 4 is a view for explaining an operation of the spindle motor according to the embodiment of the present invention.
Figure 5A:
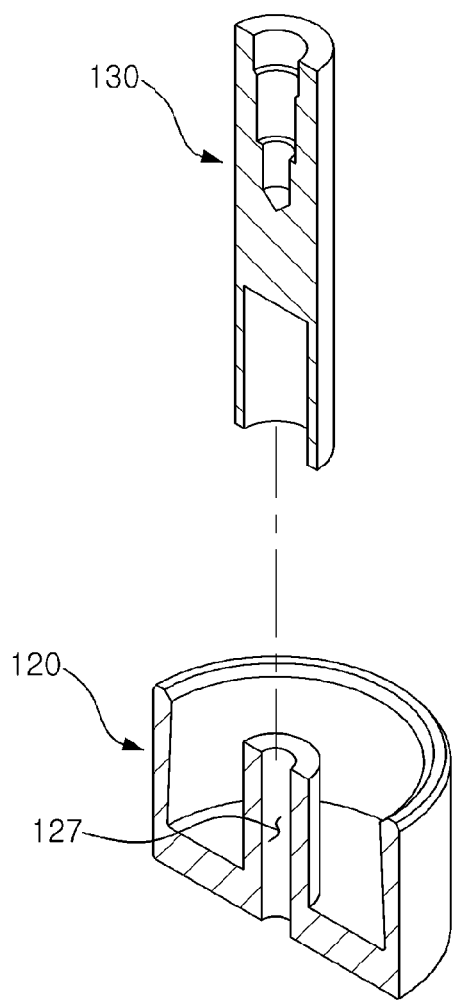
FIGS. 5A and 5B are partially cut-away perspective views illustrating a lower thrust member and a shaft according to the embodiment of the present invention.
Figure 5B:
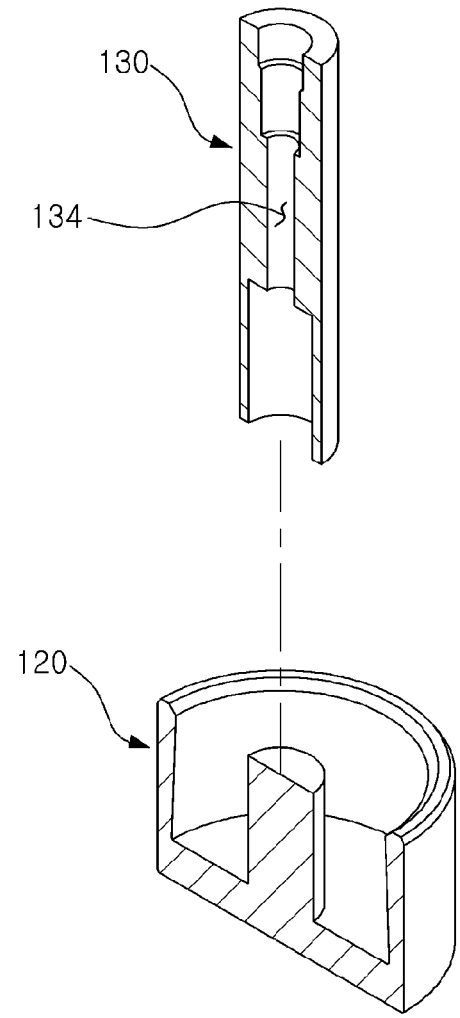
Figure 6A:
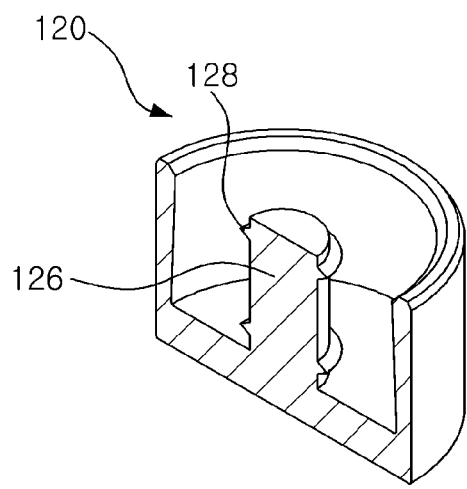
FIGS. 6A and 6B are partially cut-away perspective views illustrating a lower thrust member according to the embodiment of the present invention.
Figure 6B:
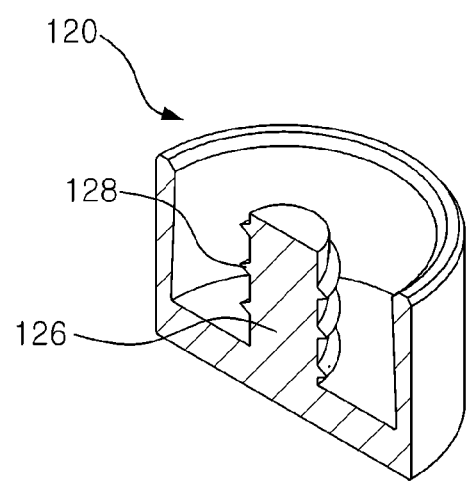

FIG. 1 is a cross-sectional view schematically illustrating a spindle motor according to an embodiment of the present invention, FIG. 2 is an enlarged view illustrating portion A of FIG. 1, FIG. 3 is a partially cut-away exploded perspective view illustrating a sleeve and upper and lower thrust members according to the embodiment of the present invention, FIG. 4 is diagram view for explaining an operation of the spindle motor according to the embodiment of the present invention, FIGS. 5A and 5B are partially cut-away perspective views illustrating a lower thrust member and a shaft according to the embodiment of the present invention, and FIGS. 6A and 6B are partially cut-away perspective views illustrating a lower thrust member according to the embodiment of the present invention.

Referring to FIGS. 1 through 6, a spindle motor 100 according to an embodiment of the present invention may include a base member 110, a lower thrust member 120, a shaft 130, a sleeve 140, a rotor hub 150, and an upper thrust member 160.

First, when defining terms for directions, in FIG. 1, an axial direction refers to a vertical direction, that is, a direction toward an upper end of the shaft 130 from a lower end thereof or vice versa, and a radial direction refers to a horizontal direction, that is, a direction toward an outer circumferential surface of the rotor hub 150 from the shaft 130 or vice versa, and a circumferential direction refers to a rotational direction along a predetermined radius around the center of rotation.

In addition, the lower thrust member 120, together with the base member 110, is included in a fixed member, that is, a stator.

The base member 110 may include an installation groove 112 so as to form a predetermined space with regard to the rotor hub 150. In addition, the base member 110 may include a coupling part 114 which extends upwardly in the axial direction and has a stator core 102 installed on an outer circumferential surface thereof.

Further, a seating surface 114a may be provided on the outer circumferential surface of the coupling part 114 so that the stator core 102 is seated thereon. Further, the stator core 102 seated on the coupling part 114 may be disposed above the installation groove 112 of the base member 110.

Here, the base member 110 may be manufactured by using aluminum (Al) in a die-casting method and may be manufactured by plastic working (for example, press working) of a steel sheet.

The lower thrust member 120 is fixed to the base member 110. That is, the lower thrust member 120 is inserted into the coupling part 114, and in more detail, the outer circumferential surface of the lower thrust member 120 may be fitted to an inner circumferential surface of the coupling part 114.

Meanwhile, the lower thrust member 120 may include a disk part 122 of which an outer surface is fixed to the base member 110, an extending part 124 extending from an outer end of the disk part 122 upwardly in the axial direction, and an insertion protrusion 126 protruding upwardly in the axial direction from the center of the disk part 122 to be inserted into a fixing groove 132 formed in a lower end of the shaft 130 to be described below.

That is, the lower thrust member 120 has a hollow space and may have a cup shape in which a protrusion is provided in the center of the hollow space. In other words, the lower thrust member 120 may have an 'E' shaped cross section.

Here, the insertion protrusion 126 of the lower thrust member 120 may have a communicating hole 127 passing though upper and lower portions thereof in the axial direction formed therein (see FIG. 5A). The communicating hole 127 naturally discharges air from the fixing groove 132 through the communicating hole 127 to improve coupling strength while the insertion protrusion 126 is inserted into the fixing groove 132.

The fixing groove 132 provided upwardly in the axial direction may be provided in a lower surface of the shaft 130 in the axial direction, and the insertion protrusion 126 of the lower thrust member 120 may be inserted into the fixing groove 132. The coupling method may use various methods such as adhesive-bonding, slide-inserting, screw-coupling, and press-fitting.

In the case in which the insertion protrusion 126 of which nothing is formed on an outer circumferential surface is inserted into the fixing groove 132, slide-coupling may be performed, but in reality, it may be very difficult to perform press-fitting. When the press-fitting method is performed in a state of surfaces of rigid bodies being in contact, a large amount of force is required or a member to be coupled during the coupling process may be deformed.

In this regard, a pressing protrusion 128 may be provided on the outer circumferential surface of the insertion protrusion 126 (see FIGS. 6A and 6B). The pressing protrusion 128 may be protruded outwardly from the outer circumferential surface of the insertion protrusion 126 in the radial direction. In the case in which the pressing protrusion 128 is provided on the outer circumferential surface of the insertion protrusion 126, since only the pressing protrusion 128 is in contact with the inner circumferential surface of the fixing groove 132, a contact area is decreased and the insertion protrusion 126 may be press-fitted to the fixing groove 132.

Furthermore, the pressing protrusion 128 may be made of a material having less strength than the shaft 130. That is, the lower thrust member 120 may be manufactured by using a softer material than the shaft 130. For example, the shaft 130 may be made of a stainless SUS material, and the lower thrust member 120 may be formed of nickel plated brass.

When the pressing protrusion 128 is made of a material having less strength than the shaft 130, in the case in which the insertion protrusion 126 is press-fitted into the fixing groove 132, the insertion protrusion 126 is modified to be press-fitted into the fixing groove 132. A front end of the pressing protrusion 128 provided on the outer circumferential surface of the insertion protrusion 126 has a sharp edge as illustrated in FIG. 3 before the insertion protrusion 126 is inserted into the fixing groove 132. However, the front end of the pressing protrusion 128 provided on the outer circumferential surface of the insertion protrusion 126 is modified to have a blunt shape as illustrated in FIGS. 1 and 2, after the insertion protrusion 126 is inserted into the fixing groove 132.

Therefore, the lower thrust member 120 may be firmly press-fitted to the lower portion of the shaft 130 in a state where an external diameter is not expanded.

The pressing protrusion 128 may be provided to have a ring shape in the circumferential direction along the outer circumferential surface of the insertion protrusion 126 (see FIG. 6A) or may be provided to have a spiral shape in the circumferential direction along the outer circumferential surface of the insertion protrusion 126 (see FIG. 6B).

Here, in the case in which the pressing protrusion 128 has the ring shape, at least two pressing protrusions 128 are provided to be vertically spaced apart from each other by a predetermined interval, and an adhesive 121 may be applied between the plurality of pressing protrusions 128. In this case, the pressing protrusions 128, provided on the uppermost and lowermost portions may serve as barriers preventing the adhesive 121 from being leaked.

Further, in the case in which the pressing protrusion 128 has the spiral shape, the adhesive 121 may be applied between the pressing protrusions 128 provided in the spiral manner. In this case, the pressing protrusions 128 which are provided on the uppermost and lowermost portions may serve as barriers preventing the adhesive 121 from being leaked.

Further, a thrust dynamic pressure groove 148 for generating thrust hydrodynamic pressure may be formed in at least one of the upper surface of the lower thrust member 120 and the lower surface of the sleeve 140.

The shaft 130 is fixedly installed on the lower thrust member 120. That is, the insertion protrusion 126 provided on the lower thrust member 120 is inserted into the fixing groove 132 provided on the lower surface of the shaft 130, and thus the shaft 130 may be firmly fixed to the lower thrust member 120.

That is, the fixing groove 132 indented upwardly in the axial direction is provided in the lower surface of the shaft 130 in the axial direction, and the insertion protrusion 126 of the lower thrust member 120 may be inserted into the fixing groove 132. Here, as the coupling method, various methods such as adhesive-bonding, slide-inserting, screw-coupling, and press-fitting may be used.

However, the case in which the shaft 130 is fixedly installed on the lower thrust member 120 is exemplified in the present embodiment, but the invention is not limited thereto. In the case in which the lower thrust member 120 is formed integrally with the base member 110, the shaft 130 may be fixedly installed on the base member 110.

Meanwhile, the shaft 130, together with the lower thrust member 120 and the base member 110, is included in the fixed member, that is, the stator.

A coupling member, for example, a screw part to which a screw is fastened, may be provided on the upper surface of the shaft 130 so as to fix a cover member thereto (not shown).

Further, the shaft 130 may have a through hole 134 passing through the upper and lower portions thereof in the axial direction to communicate the fixing groove 132 with the outside (see FIG. 5B). The through hole 134 naturally discharges air from the fixing groove 132 through the through hole 134 to improve coupling strength, while the insertion protrusion 126 is inserted into the fixing groove 132.

The sleeve 140 may be rotatably installed with respect to the shaft 130. To this end, the sleeve 140 may include a shaft hole 141 into which the shaft 130 is inserted. Meanwhile, when the sleeve 140 is installed with respect to the shaft 130, the inner circumferential surface of the sleeve 140 and the outer circumferential surface of the shaft 130 are spaced apart from each other by a predetermined interval to form a bearing gap B. In addition, the bearing gap B is filled with a lubricant.

Meanwhile, the sleeve 140 may have an inclined part 143 on the upper portion thereof. An upper external diameter of the inclined part 143 is larger than a lower external diameter so as to form a liquid-gas interface together with the upper thrust member 160.

In other words, the inclined part 143 of which the upper external diameter is larger than the lower external diameter may be formed on the upper portion of the sleeve 140 so that a first liquid-gas interface F1 may be formed in a space between the outer circumferential surface of the sleeve 140 and the inner circumferential surface of the upper thrust member 160.

Meanwhile, the sleeve 140 may have a stepped surface 144, stepped with respect to the upper surface of the sleeve 140, to form a sealing groove 106. The stepped surface 144 will be described below in detail.

Further, the rotor hub 150 is joined to the outer circumferential surface of the sleeve 140. That is, a lower portion of the stepped surface 144 has a shape corresponding to an inner surface of the rotor hub 150 so that the rotor hub 150 may be fixedly installed. That is, a joining surface 145 may be formed on the outer circumferential surface of the sleeve 140. Here, the sleeve 140 and the rotor hub 150 may be integrally provided. In the case in which the sleeve 140 and the rotor hub 150 are integrally provided and both the sleeve 140 and the rotor hub 150 are provided as a single member, the number of components is reduced and product assembly may be facilitated.

Meanwhile, a lower portion of the outer circumferential surface of the sleeve 140 may be upwardly inclined inwardly in the radial direction so as to form a liquid-gas interface together with the extending part 124 of the lower thrust member 120.

That is, the lower portion of the sleeve 140 may be upwardly inclined inwardly in the radial direction so that a second liquid-gas interface F2 may be formed in a space between the outer circumferential surface of the sleeve 140 and the extending part 124 of the lower thrust member 120.

As such, since the second liquid-gas interface F2 is formed in the space between the lower portion of the sleeve 140 and the extending part 124, the lubricant filling the bearing gap B forms the first liquid-gas interface F1 and the second liquid-gas interface F2.

Further, the sleeve 140 may have a radial dynamic pressure groove 146 formed in an inner surface thereof, for generating hydrodynamic pressure in the lubricant filling the bearing gap B when the sleeve 140 is rotated. That is, the radial dynamic pressure groove 146 may be configured of upper and lower radial dynamic pressure grooves 146a and 146b as illustrated in FIGS. 3 and 4.

However, the radial dynamic pressure groove is not limited to being formed in the inner surface of the sleeve 140, and may be formed in the outer circumferential surface of the shaft 130 and may be provided to have various shapes such as herringbone, spiral, helical shapes.

The rotor hub 150 is coupled to the sleeve 140 to rotate in conjunction therewith.

The rotor hub 150 may include a rotor hub body 152 having an inserting part 152a into which the upper thrust member 160 is inserted, a mounting part 154 extending from an edge of the rotor hub body 152 and having a magnet assembly 180 mounted on an inner surface thereof, and an extending part 156 extending from an edge of the mounting part 154 outwardly in the radial direction.

Meanwhile, a lower portion of an inner surface of the rotor hub body 152 may be joined to the outer surface of the sleeve 140. That is, the lower portion of the inner surface of the rotor hub body 152 may be press-fitted or slide-coupled to the joining surface 145 of the sleeve 140 and may be joined by an adhesive or/and welding.

Accordingly, the sleeve 140 may rotate together with the rotor hub 150 when the rotor hub 150 rotates.

Further, the mounting part 154 extends downwardly in the axial direction from the rotor hub body 152. In addition, the magnet assembly 180 may be fixed to the inner surface of the mounting part 154.

Meanwhile, the magnet assembly 180 may be configured of a yoke 182 fixed to the inner surface of the mounting part 154 and a magnet 184 installed on an inner circumferential surface of the yoke 182.

The yoke 182 serves to increase a magnetic flux density so that a magnetic field generated from the magnet 184 is directed to the stator core 102. Meanwhile, the yoke 182 may have a circular ring shape and may have a bent end portion so as to improve magnetic flux density due to the magnetic field generated by the magnet 184.

The magnet 184 may have a ring shape and may be a permanent magnet generating a magnetic field having a predetermined magnitude when an N pole and an S pole are alternately magnetized in a circumferential direction.

Meanwhile, the magnet 184 faces a front end of the stator core 102 on which a coil 101 is wound, and driving force is generated by electromagnetic interaction between the magnet 184 and the stator core 102 on which the coil 101 is wound, thereby allowing the rotor hub 150 to rotate.

That is, when power is supplied to the coil 101, driving force is generated through the electromagnetic interaction of the stator core 102, on which the coil 101 is wound, and the magnet 184 facing the stator core 102, so that the rotor hub 150 may rotate in conjunction with the sleeve 140.

The upper thrust member 160 includes a fixing hole 162a into which the upper end portion of the shaft 130 is inserted, and thus, the upper thrust member 160 is fixed to the upper end portion of the shaft 130 to form a liquid-gas interface together with the sleeve 140.

Meanwhile, the upper thrust member 160 may include a body 162 having the fixing hole 162a so that the inner surface thereof is joined to the shaft 130, and a protrusion 164 extending from the body 162 to form a liquid-gas interface together with the inclined part 143.

The protrusion 164 extends downwardly from the body 162 in the axial direction, and an inner surface thereof may face the inclined part 143.

Further, the protrusion 164 may extend from the body 162 in parallel to the shaft 130.

In addition, the upper thrust member 160 may be inserted into a space formed by the upper portion of the outer circumferential surface of the shaft 130, and the outer surface of the sleeve 140, and the inner surface of the rotor hub 150.

Further, the upper thrust member 160, together with the base member 110, the lower thrust member 120, and the shaft 130, may be included in the fixed member, that is, the stator.

Meanwhile, since the upper thrust member 160 is fixed to the shaft 130 and the sleeve 140 rotates together with the rotor hub 150, the first liquid-gas interface F1 formed in the space between the inclined part 143 of the sleeve 140 and the protrusion 164 is inclined toward the inclined part 143 of the sleeve 140 during rotation of the sleeve 140 as illustrated in FIG. 4.

That is, since the first liquid-gas interface F1 is leaning toward the outer circumferential surface of the sleeve 140, the lubricant may be less dispersed by centrifugal force.

In addition, the outer circumferential surface of the upper thrust member 160 and the inner surface of the rotor hub 150 opposed thereto form a labyrinth seal. That is, the outer surface of the upper thrust member 160 and the inner surface of the rotor hub body 152 are spaced apart from each other by a predetermined interval, and form the labyrinth seal so as to prevent air containing the evaporated lubricant from flowing to the outside.

Accordingly, air containing the evaporated lubricant may be prevented from flowing to the outside, thereby suppressing a reduction in an amount of lubricant.

Further, the outer circumferential surface of the upper thrust member 160 and the inner surface of the rotor hub body 152 may have a gap of 0.3 mm or less therebetween.

Meanwhile, the thrust dynamic pressure groove 148 for generating thrust dynamic pressure may be formed in at least one of the lower surface of the upper thrust member 160 or the upper surface of the sleeve 140 opposing thereto.

In addition, the upper thrust member 160 may serve as a sealing member which prevents the lubricant filling the bearing gap B from being leaked upwardly.

By narrowing a distance of the gap between the upper thrust member 160 and the rotor hub 150, the lubricant filling in the bearing gap B may be prevented from being reduced by suppressing the air containing the evaporated lubricant from being leaked to the outside.

Meanwhile, among the rotating member (that is, the sleeve) and the fixed members (that is, the upper and lower thrust members) forming the liquid-gas interfaces, that is, the first liquid-gas interface F1 and the second liquid-gas interface F2, the rotating member is disposed inwardly of the fixed members in the radial direction, such that the dispersion of the lubricant may be reduced by the centrifugal force.

Figure 7:
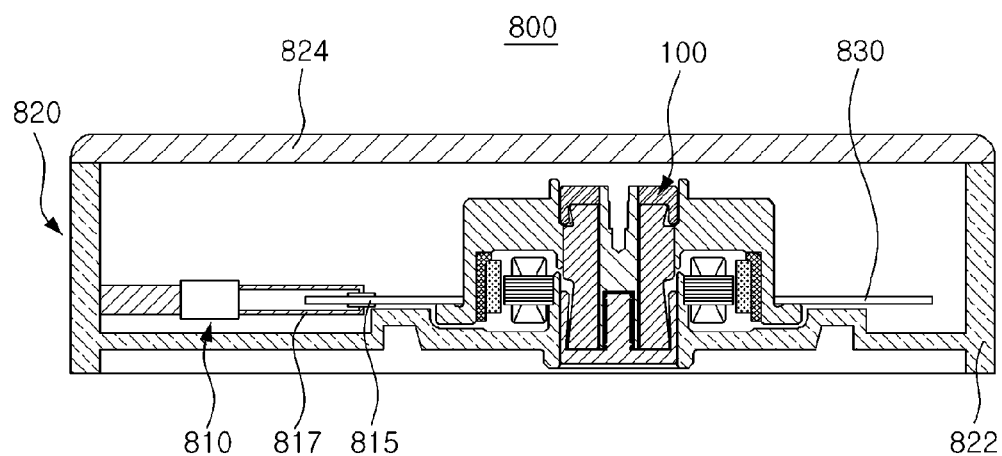
FIG. 7 is a cross-sectional view schematically illustrating a recording disk driving device having a motor mounted thereon according to an embodiment of the present invention.

FIG. 7 is a cross-sectional view schematically illustrating a recording disk driving device having a motor mounted thereon according to an embodiment of the present invention.

Referring to FIG. 7, a recording disk driving device 800 having the motor 100 mounted thereon according to the embodiment of the present invention may be a hard disk driving device, and may include the motor 100, a head transferring unit 810, and a housing 820.

The motor 100 has all features of the above-described motor and may have a recording disk 830 mounted thereon.

The head transferring unit 810 may transfer a magnetic head 815 detecting information of the recording disk 830 mounted on the motor 100 to a surface of the recording disk to be detected.

Here, the magnetic head 815 may be disposed on a support 817 of the head transferring unit 810.

The housing 820 may include a motor mounting plate 822 and a top cover 824 shielding an upper portion of the motor mounting plate 822, in order to form an internal space receiving the motor 100 and the head transferring unit 810 therein.

As set forth above, according to embodiments of the present invention, a spindle motor can be thinned by allowing a thickness of a lower thrust member to be relatively thin while serving as a fixed shaft-type spindle motor.

Further, the spindle motor is capable of improving operational performance because the length of a bearing span can be increased by allowing the thickness of the lower thrust member to be thin while serving as the fixed shaft-type spindle motor.

While the present invention has been shown and described in connection with the embodiments, it will be apparent to those skilled in the art that modifications and variations can be made without departing from the spirit and scope of the invention as defined by the appended claims.

What is claimed is:

1. A spindle motor, comprising:
   a lower thrust member fixed to a base member;
   a shaft fixed to the lower thrust member;
   a sleeve disposed on the lower thrust member and rotatably installed with respect to the shaft; and
   a rotor hub coupled to the sleeve to rotate in conjunction therewith,
   wherein the lower thrust member has an insertion protrusion protruding upwardly in an axial direction and inserted into a fixing groove formed in a lower end of the shaft upwardly in the axial direction.

2. The spindle motor of claim 1, wherein the insertion protrusion is press-fitted into the fixing groove.

3. The spindle motor of claim 2, wherein the insertion protrusion has a pressing protrusion provided on an outer circumferential surface thereof.

4. The spindle motor of claim 3, wherein the pressing protrusion has less strength than the shaft.

5. The spindle motor of claim 3, wherein the pressing protrusion is provided to have a circular shape in a circumferential direction along the outer circumferential surface of the insertion protrusion.

6. The spindle motor of claim 3, wherein the pressing protrusion is provided to have a spiral shape in a circumferential direction along the outer circumferential surface of the insertion protrusion.

7. The spindle motor of claim 5, wherein the pressing protrusion comprises at least two pressing protrusions vertically spaced apart from each other by a predetermined interval, and
   the at least two pressing protrusions has an adhesive applied therebetween.

8. The spindle motor of claim 6, wherein the pressing protrusion having the spiral shape has an adhesive applied therebetween.

9. The spindle motor of claim 1, wherein the insertion protrusion is slide-inserted or screw-coupled to the fixing groove.

10. The spindle motor of claim 1, wherein the insertion protrusion is bonded to the fixing groove by an adhesive.

11. The spindle motor of claim 1, wherein the shaft includes a through hole allowing the fixing groove to communicate with the outside in the axial direction.

12. The spindle motor of claim 1, wherein the insertion protrusion of the lower thrust member has a communicating hole passing through upper and lower portions thereof in the axial direction.

13. The spindle motor of claim 1, wherein the lower thrust member and the sleeve forms a liquid-gas interface of a lubricant and air therebetween.

14. The spindle motor of claim 1, further comprising an upper thrust member fixed to an upper end portion of the shaft and forming a liquid-gas interface of a lubricant and air with the sleeve.

15. The spindle motor of claim 1, wherein the sleeve and the rotor hub are integrally formed.

16. The spindle motor of claim 1, wherein shapes of an outer circumferential surface of the shaft are the same as each other before and after the insertion protrusion is inserted into the fixing groove.

17. The spindle motor of claim 1, wherein the base member and the lower thrust member are integrally formed.

18. A hard disk drive, comprising:
   a spindle motor rotating a disk by power supplied through a substrate;
   a magnetic head reading data from and writing data to the disk; and
   a head transferring unit moving the magnetic head to a predetermined position above the disk,
   wherein the spindle motor comprises
     a lower thrust member fixed to a base member;
     a shaft fixed to the lower thrust member;
     a sleeve disposed on the lower thrust member and rotatably installed with respect to the shaft; and
     a rotor hub coupled to the sleeve to rotate in conjunction therewith,
     wherein the lower thrust member has an insertion protrusion protruding upwardly in an axial direction and inserted into a fixing groove formed in a lower end of the shaft upwardly in the axial direction.

* * * * *